US008510654B2

(12) United States Patent
Janus

(10) Patent No.: US 8,510,654 B2
(45) Date of Patent: *Aug. 13, 2013

(54) TECHNIQUES FOR SHUFFLING VIDEO INFORMATION

(75) Inventor: Scott Janus, Rocklin, CA (US)

(73) Assignee: Intel Corporation, Santa Clara, CA (US)

(*) Notice: Subject to any disclaimer, the term of this patent is extended or adjusted under 35 U.S.C. 154(b) by 762 days.

This patent is subject to a terminal disclaimer.

(21) Appl. No.: 12/626,757

(22) Filed: Nov. 27, 2009

(65) Prior Publication Data

US 2010/0071073 A1 Mar. 18, 2010

Related U.S. Application Data

(63) Continuation of application No. 11/171,975, filed on Jun. 29, 2005, now Pat. No. 7,647,557.

(51) Int. Cl.
G06F 3/00 (2006.01)
G06F 1/24 (2006.01)
H04N 7/16 (2011.01)
H04N 7/167 (2011.01)
H04N 5/913 (2006.01)
G11B 27/34 (2006.01)

(52) U.S. Cl.
CPC ............ H04N 5/913 (2013.01); G11B 27/34 (2013.01)
USPC ............ 715/723; 715/719; 715/741; 725/25; 380/210; 713/100

(58) Field of Classification Search
USPC .......... 715/741, 719–723; 725/25; 380/210; 713/100
See application file for complete search history.

(56) References Cited

U.S. PATENT DOCUMENTS

| 5,497,476 | A | * | 3/1996 | Oldfield et al. ............... 711/112 |
| 6,178,289 | B1 | | 1/2001 | Jang |
| 6,628,294 | B1 | | 9/2003 | Sadowsky et al. |
| 7,184,550 | B2 | * | 2/2007 | Graunke ........................ 380/42 |
| 7,647,557 | B2 | | 1/2010 | Janus |
| 2001/0053222 | A1 | | 12/2001 | Wakao et al. |
| 2004/0054877 | A1 | | 3/2004 | Macy et al. |
| 2004/0075773 | A1 | | 4/2004 | Kimura |
| 2004/0160446 | A1 | * | 8/2004 | Gosalia et al. ................ 345/503 |
| 2006/0080743 | A1 | | 4/2006 | Zhu et al. |
| 2007/0006271 | A1 | | 1/2007 | Janus |

* cited by examiner

Primary Examiner — Kieu Vu
Assistant Examiner — James T Durkin
(74) Attorney, Agent, or Firm — Kacvinsky Daisak PLLC

(57) ABSTRACT

An apparatus, system, method, and article for shuffling video information are described. The apparatus may include a media processing node to receive video information. The media processing node may include a shuffling module to shuffle the video information according to a shuffle order and a trusted entity programmed based on the shuffle order to provide access to the video information. The video information may be provided in an unshuffled manner when accessed through the trusted entity. Other embodiments are described and claimed.

20 Claims, 6 Drawing Sheets

TECHNIQUES FOR SHUFFLING VIDEO INFORMATION

BACKGROUND

When most video content is played back on a personal computer (PC), a complete, ordered version of every video frame exists somewhere in the system or graphics memory. It is thus possible for an adversary to build a "screen scraper" which crawls through all of memory looking for contiguous video data. Once the video data is found, the screen scraper can copy the pixels to the hard disk and thus retrieve a pixel-perfect copy of the content being played.

Future content protection standards, such as those being proposed for High-Definition Digital Versatile Disc (HD-DVD) pre-recorded content, may require protection against the screen scraper class of attacks. Accordingly, there may exist the need for video content protection techniques to mitigate such an attack vector.

DETAILED DESCRIPTION

Figure 1:
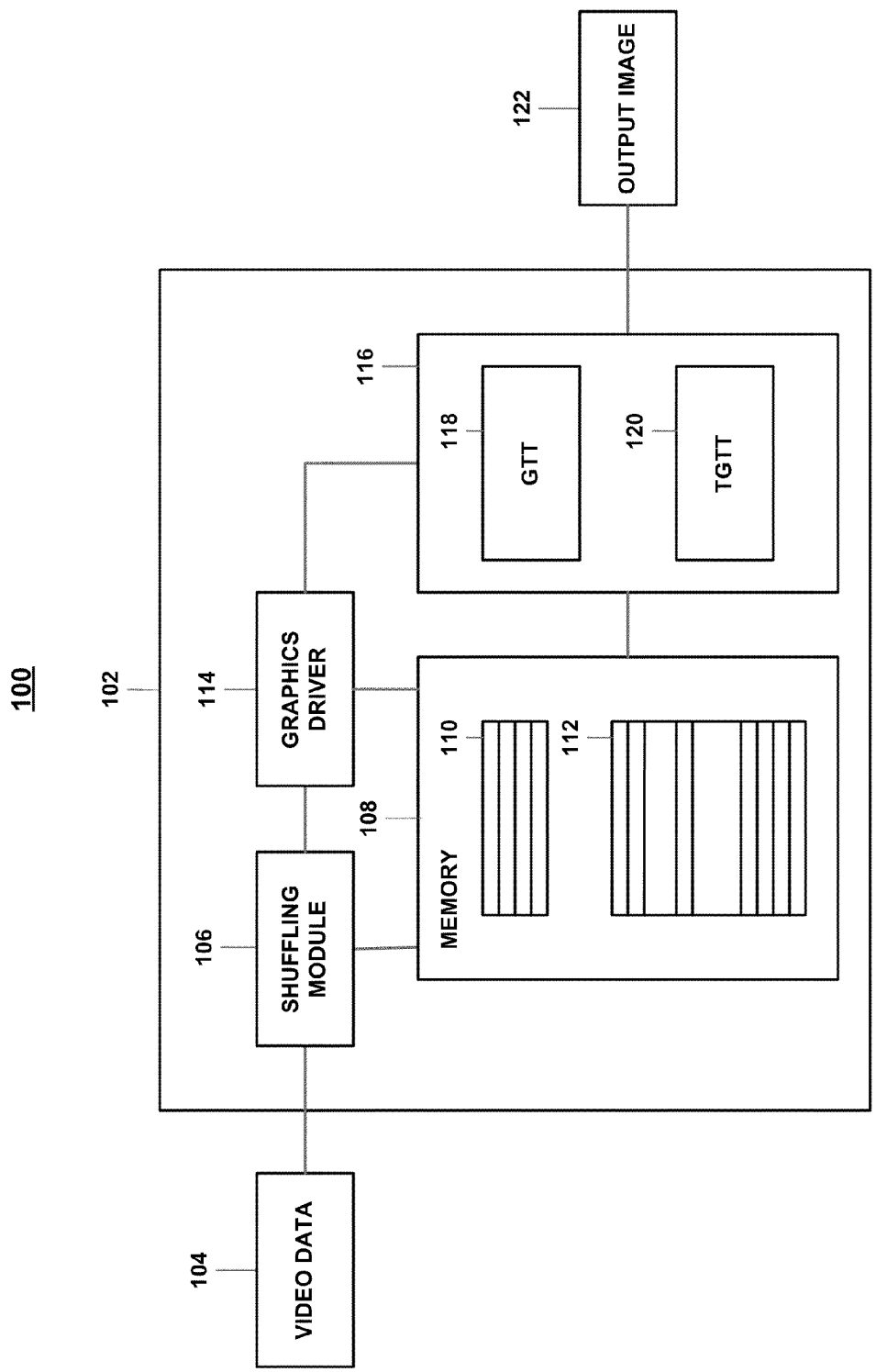
FIG. 1 illustrates one embodiment of a system.

FIG. 1 illustrates one embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a hand-held computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

In various embodiments, the communications system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as NTSC, PAL, MPEG-1, MPEG-2, MPEG-4, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003. The embodiments are not limited in this context.

As shown in FIG. 1, the communications system 100 may comprise a media processing node 102. In various embodiments, the media processing node 102 may comprise, or be implemented as, one or more of a processing system, a processing sub-system, a processor, a computer, a device, an encoder, a decoder, a coder/decoder (CODEC), a filtering device (e.g., graphic scaling device, deblocking filtering device), a transformation device, an entertainment system, a display, or any other processing architecture. The embodiments are not limited in this context.

In various embodiments, the media processing node 102 may be arranged to process one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The embodiments are not limited in this context.

In various embodiments, media processing node 102 may be arranged to process media information received from a media source node 104. The media source node 104 may comprise any media source capable of delivering media information such as image information, video information, and/or audio/video (A/V) information. An example of a media source may include a source for video signals, such as from a computer to a display. Another example of a media source may include a source for A/V signals such as television signals. The media source may be arranged to source or deliver standard analog television signals, digital television signals, HDTV signals, and so forth. The television signals may include various types of information, such as television audio information, television video information, and television control information. The television video information may include content from a video program, computer generated images (CGI), and so forth. The television audio information may include voices, music, sound effects, and so forth. The television control information may be embedded control signals to display the television video and/or audio information, commercial breaks, refresh rates, synchronization signals, and so forth. The embodiments are not limited in this context.

In some embodiments, the media source node 104 may include a device arranged to deliver pre-recorded media stored in various formats, such as a Digital Video Disc (DVD) device, a Video Home System (VHS) device, a digital VHS device, a digital camera, A/V camcorder, a gaming console, a Compact Disc (CD) player, and so forth. In yet another example, the media source node 104 may include media distribution systems to provide broadcast or streaming analog or digital television or audio signals to media processing node 102. Examples of media distribution systems may include, for example, Over The Air (OTA) broadcast systems, terrestrial cable systems (CATV), satellite broadcast systems, and so forth. The types and locations of the media source node 104 are not limited in this context.

In various embodiments, the media processing node 102 may be arranged to receive video information. The video information may comprise any data derived from or associated with one or more video images. In various embodiments, the input image may comprise one or more of video data, image data, video sequences, groups of pictures, pictures, images, regions, objects, frames, slices, macroblocks, blocks, pixels, signals, and so forth. The values assigned to pixels may comprise real numbers and/or integer numbers. In various implementations, the video information may comprise premium video content. The embodiments are not limited in this context.

In various embodiments, the media processing node 102 may be arranged to receive video information and to perform one or more shuffling operations. The shuffling operations may provide video content protection, such as premium video content protection, for example. In various implementations, the media processing node 102 may be arranged to shuffle the order of video information while keeping the content of the video information intact. For example, the media processing node 102 may shuffle the memory page order for a frame of video information while keeping the block order and/or pixel data intact within the page. The shuffling order may be changed to provide additional security. For example, the shuffling order may be changed for every frame of video information. The media processing node 102 may be arranged to store the video information such that the correct order of the video information can be viewed in a trusted environment, and the shuffled order of the video information is viewed in an untrusted environment. The embodiments are not limited in this context.

As shown FIG. 1, the media processing node 102 may comprise multiple modules. The modules may comprise, or be implemented as, one or more systems, sub-systems, processors, devices, machines, tools, components, circuits, registers, applications, programs, subroutines, or any combination thereof, as desired for a given set of design or performance constraints. In various embodiments, the modules may be connected by one or more communications media. Communications media generally may comprise any medium capable of carrying information signals. For example, communication media may comprise wired communication media, wireless communication media, or a combination of both, as desired for a given implementation. The embodiments are not limited in this context.

The media processing node 102 may comprise a shuffling module 106. In various embodiments, the shuffling module 106 may be arranged to receive video information and shuffle the video information according to a shuffle order. In various implementations, shuffling the video information may comprise shuffling the page order for a frame of video information. For example, a page comprising 4096 bytes and 64 video blocks may be used as a fundamental unit of shuffling. The shuffling module 106 may shuffle the page order for a frame of video information while keeping the page content (e.g., block order and/or pixel data) intact. For example, the 64 contiguous video blocks within a page may remain in order after shuffling. The video information may be stored, however, such that adjacent pages do not contain contiguous sets of blocks. The shuffle order may be changed for every frame of video information. The embodiments are not limited in this context.

The media processing node may comprise memory 108 which may be implemented as various types of computer-readable storage media capable of storing data, including both volatile and non-volatile memory. Examples of storage media include random-access memory (RAM), dynamic RAM (DRAM), Double-Data-Rate DRAM (DDRAM), synchronous DRAM (SDRAM), flash memory, ROM, programmable ROM (PROM), erasable programmable ROM (EPROM), electrically erasable programmable ROM (EEPROM), flash memory, content addressable memory (CAM), polymer memory (e.g., ferroelectric polymer memory, ovonic memory, phase change or ferroelectric memory), silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information. The storage media may contain various combinations of machine-readable storage devices and/or various controllers to store computer program instructions and data. The embodiments are not limited in this context.

The memory 108 may comprise graphics memory. The graphics memory may be arranged to store video information, for example. In various implementations, the graphics memory may store video information as pages. In various embodiments, the graphics memory may comprise or be implemented by physical memory such as system memory. For example, the memory 108 may comprise a system memory to implement graphics memory using the Unified Memory Architecture (UMA) of an integrated graphic chipset made by Intel Corporation, Santa Clara, Calif., for example. The embodiments are not limited in this context.

In various embodiments, the memory 108 may comprise pre-allocated memory buffers 110. The pre-allocated memory buffers 110 may be pre-allocated during initialization operations, such as power-on self test (POST) operations, for example. In various implementations, the pre-allocated memory buffers 110 may be logically hidden from an operating system (OS). The pre-allocated memory 112 buffers may be used for legacy video graphic array (VGA) support, for example. The embodiments are not limited in this context.

In various embodiments, the memory 108 may comprise frame buffers 112. The frame buffers 112 may comprise system-allocated memory, for example. In various implementations, the frame buffer 112 may comprise pages of memory (e.g., one page=4096 bytes=64 blocks) to perform graphics operations. The embodiments are not limited in this context.

The media processing node 102 may comprise a graphics driver module 114. The graphics driver module 114 may be arranged to request memory locations (e.g., addresses, regions) for performing graphics operations, for example. In various embodiments, the shuffling module 106 may be arranged to request memory locations through the graphic driver 114. In such embodiments, the graphics driver 114 may be arranged to provide memory locations to the shuffling module 106. In various implementations, when additional memory is required to perform complex graphics operations, the graphics driver module 114 may be arranged to request the additional memory from the OS. When data is written, the OS may operate transparently to ensure that the data is stored in the proper memory locations. The embodiments are not limited in this context.

The media processing node 102 may comprise graphics hardware 116. The graphics hardware 116 may be arranged to perform various graphics operations, for example. In various embodiments, the graphics hardware 116 may comprise a graphics chipset and/or a graphics processor, for example. The embodiments are not limited in this context.

In various embodiments, the graphics hardware 116 may comprise a graphics translation table (GTT) 118. The GTT 118 may comprise or be implemented by a scatter-gather table. In various implementations, the GTT 118 may comprise a collection of page table entries (PTEs). Each PTE may point to a page in memory 108, for example. In some cases, the operations performed by the graphics hardware 116 may require use of contiguous memory pages. There is no guarantee, however, that the memory pages returned by the OS will be in contiguous order. The GTT 118 may be arranged to allow physically non-adjacent pages to appear contiguous to the graphics hardware 116. The embodiments are not limited in this context.

In various embodiments, the graphics hardware 116 may comprise a trusted GTT (TGTT) 120. The TGTT 120 may comprise or be implemented by a scatter-gather table. In various implementations, the TGTT 120 may comprise a collection of trusted PTEs (TPTEs), and each TPTE may point to a page in memory 108. In various implementations, the TGTT 120 may be arranged to provide a trusted environment by allowing only trusted entities to perform read and/or write operations, for example. The TGTT 120 may be arranged to allow physically non-adjacent pages to appear contiguous to the graphics hardware 116. The embodiments are not limited in this context.

In various implementations, video information may be stored in memory 108 according to a shuffle order. In one embodiment, for example, the shuffling module 106 may be arranged to store video information (e.g., blocks, pixels) in the frame buffers 112 of memory 108 according to a shuffled order. In various implementations, the shuffle order may be changed periodically (e.g., per frame) to provide additional security. The embodiments are not limited in this context.

In various implementations, the shuffling module 106 may be arranged to shuffle the order of the frame buffers 112 such that the video information is not stored in a naïve, linear fashion. For example, video information for picture is not stored in the in the frame buffers 112 in the correct order. In various implementations, shuffling the video information may comprise shuffling the page order for a frame of video information, while keeping the content (e.g., block order and/or pixel data) of the video information intact. For example, pages (0, 1, 2, 3) of a frame may be shuffled according to a shuffle order (3, 2, 0, 1). It is noted that the shuffle order does not necessarily correspond to the order of the pages in physical memory. In this example, while contiguous blocks of each page may remain intact, adjacent pages do not necessarily contain contiguous sets of blocks. The embodiments are not limited in this context.

In various implementations, the shuffling module 106 may encrypt the shuffling order. For example, the shuffling module 106 may encrypt the shuffled page order needed to unshuffle the video information and obtain a correct picture. In various implementations, the shuffling module 106 may provide the encrypted shuffling order to the graphics driver module 114 via a secure command. The embodiments are not limited in this context.

In various embodiments, the graphics driver module 114 may be arranged to program a trusted entity, such as the TGTT 120. In various implementations, the graphics driver module 114 may be arranged to program the TGTT 120 based on the shuffle order such that when the graphics hardware 116 accesses the video information through the TGTT 120, the graphics hardware 116 may comprehend the video information in an unshuffled manner (e.g., correct page order). For example, the graphics driver module 116 may be arranged to instruct the TGTT 120 to program various TPTEs to unshuffle stored video information. In some embodiments, the graphics driver module 114 may be arranged to program the TGTT 120 after decrypting the shuffling order. The embodiments are not limited in this context.

The media processing node 102 may provide video information to media destination node 122. The media destination node 122 may comprise any media destination capable of receiving media information such as image information, video information, and/or A/V information. In various embodiments, the media destination node 122 may comprise, or be implemented as, one or more of a system, a sub-system, a processor, a computer, a device, an entertainment system, a display, or any other architecture. The embodiments are not limited in this context.

In embodiments, the destination node 122 may receive video information from the graphics hardware 116 of the media processing node 102. In various implementations, the destination node 122 may receive video information in a shuffled order when accessing the graphics hardware through the GTT 118 and may receive video information in a correct order when accessing the graphics hardware 116 through the TGTT 120. The destination node 122 may be arranged to display unshuffled video information as an output image and/or perform further processing such as decoding, for example. The embodiments are not limited in this context.

In various implementations, the media destination node 122 may view an output image in the correct order when accessing the video information through the TGTT 120. To display the picture, the graphics driver 144 may create a command to display the overlay at the logical-trusted-address corresponding to one or more TPTEs. The command may be dispatched to a trusted ring buffer, for example. The execution of the overlay command may involve a lookup of the address in the TGTT 120 to determine the actual physical pages being used. The trusted graphics overlay hardware may correctly display the picture to a screen of the destination node 122. The embodiments are not limited in this context.

Figure 2:
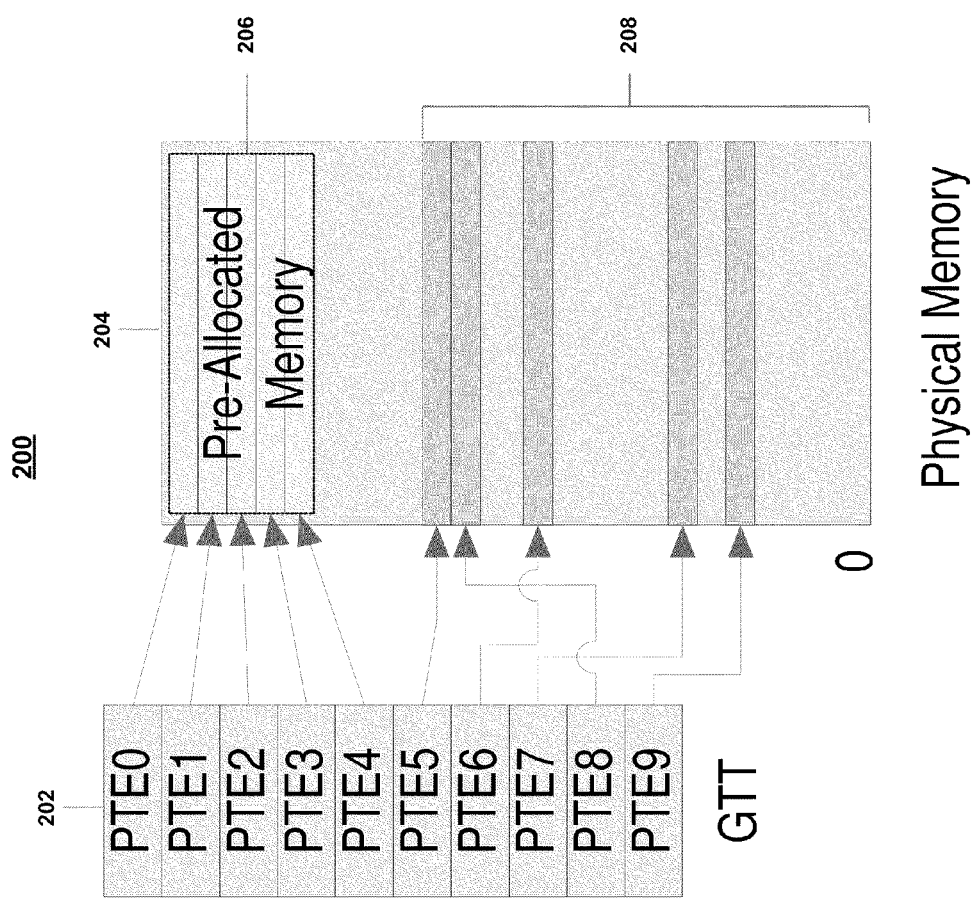
FIG. 2 illustrates one embodiment of a node.

FIG. 2 illustrates one embodiment of a node. FIG. 2 illustrates one embodiment of a media processing node 200. As shown, the media processing node 200 may comprise a GTT 202 and physical memory 204. In this embodiment, the physical memory 204 may be linear (no tiling) and arranged to store a shuffled frame comprising four pages of memory. In various implementations, the GTT 202 may be programmed to point to pre-allocated memory buffers 206 and system-allocated memory buffers 208 in the physical memory 204. The GTT 202 may be programmed by a graphics driver module (e.g., graphics driver module 114), for example. In this example, the GTT 202 may comprise ten PTEs (PTE0-PTE9). It can be appreciated that the GTT 202 may comprise a greater number or a fewer number of PTEs for a given implementation. For example, in various implementations, the GTT 202 may be much larger and comprise many more PTEs. The embodiments are not limited in this context.

Figure 3:
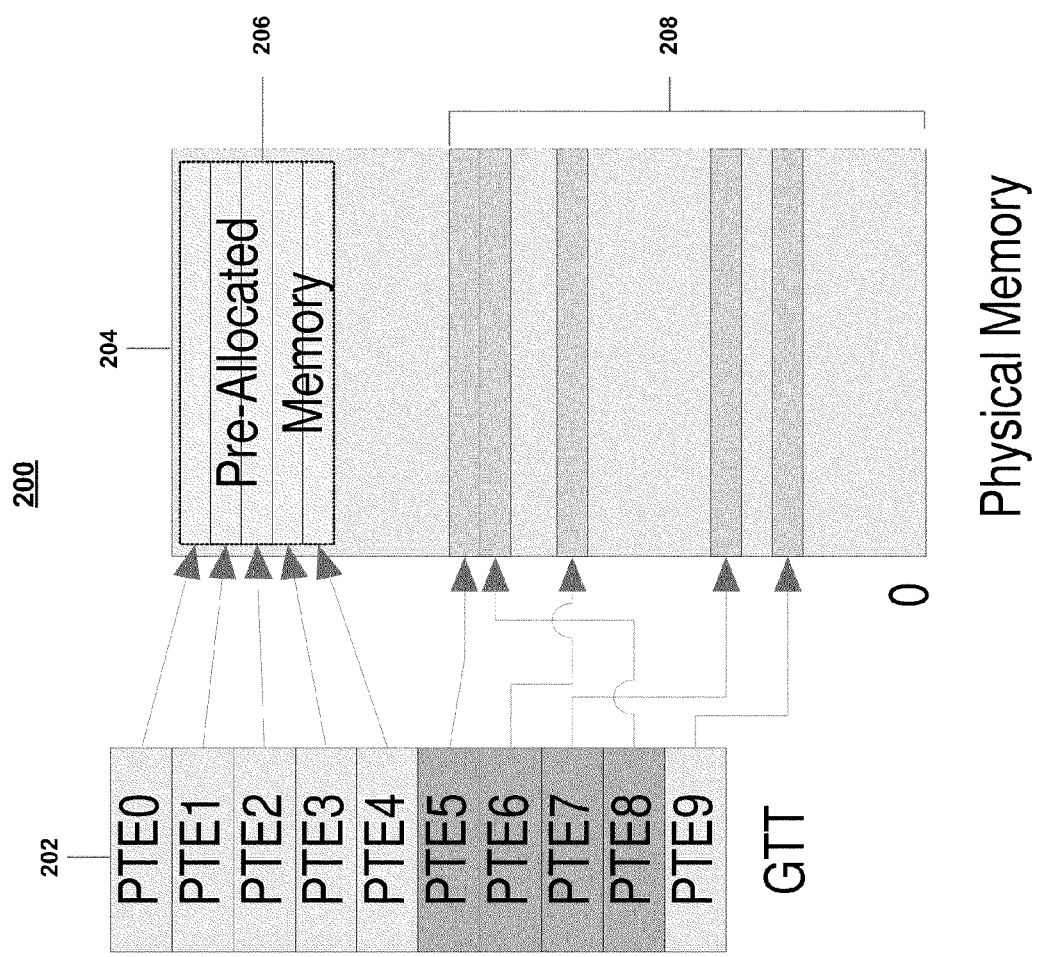
FIG. 3 illustrates one embodiment of a node.

FIG. 3 illustrates one embodiment of a node. FIG. 3 illustrates one embodiment of a media processing node 200. As shown, the media processing node 200 may comprise a GTT 202 and physical memory 204. In this embodiment, the physical memory 204 may comprise an allocated surface in graphics memory. The surface may be allocated by a graphics driver module (e.g., graphics driver module 114) during initialization, for example. As shown, the allocated surface may comprise a number of pages (e.g., 4 pages) in size. In various implementations, the actual pages used to create the surface may be scattered in physical memory 204, but may be contiguous entries in the GTT 202. In this example, contiguous GTT entries PTE5 through PTE8 may be used. The embodiments are not limited in this context.

Figure 4:
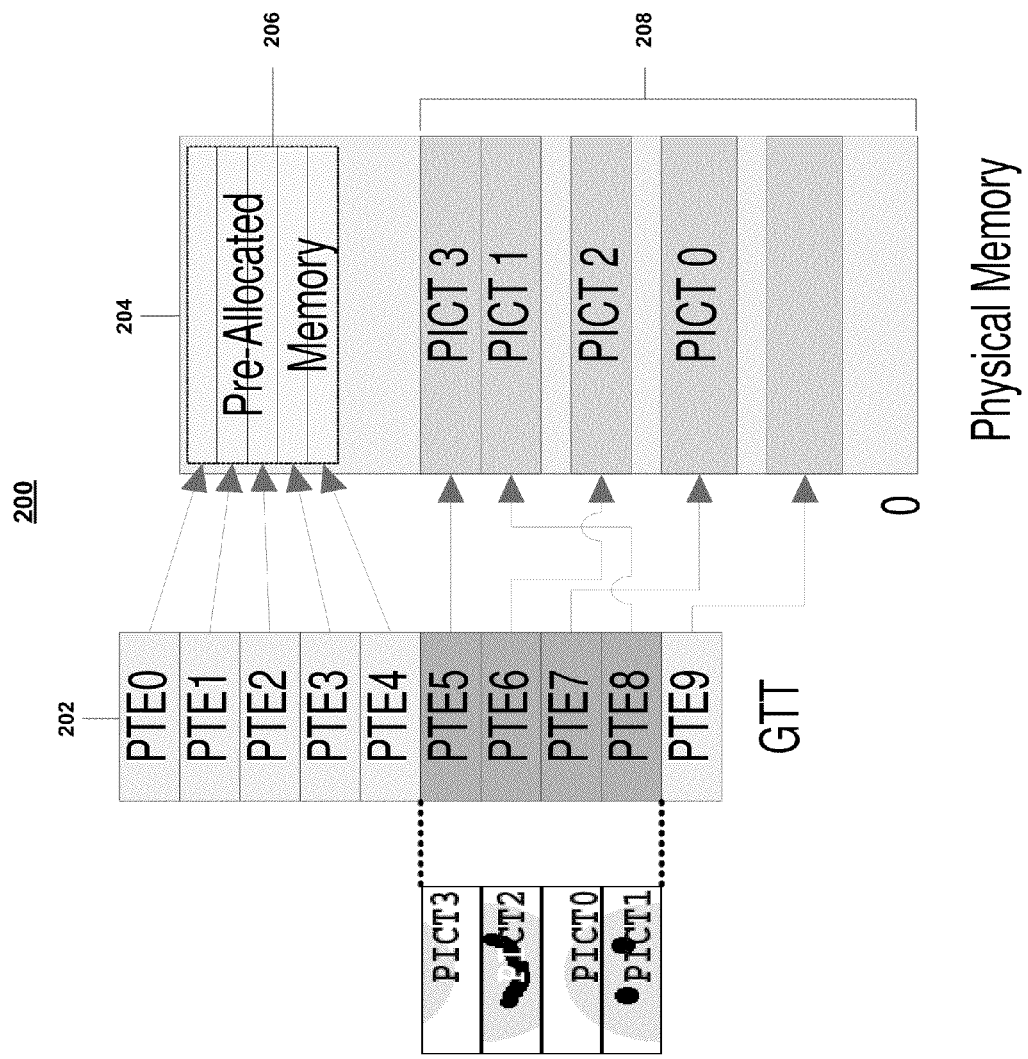
FIG. 4 illustrates one embodiment of a node.

FIG. 4 illustrates one embodiment of a node. FIG. 4 illustrates one embodiment of a media processing node 200. As shown, the media processing node 200 may comprise a GTT 202 and physical memory 204. In this embodiment, buffers in memory (e.g., system-allocated memory buffers 208) may be filled with video data (e.g., pixels). In various implementations, pictures are not stored in the system-allocated memory buffers 208 in the correct order. In this example, a shuffle order 3, 2, 0, 1 may be used to shuffle one or more pictures on a page granularity. It is noted that the shuffle order does not correspond to the order of the picture pages in physical memory. In various implementations, video information may be received in a shuffled order when accessed through the GTT 202. As shown in this example, contiguous GTT entries PTE5 through PTE8 pages may point to pages (PICT3, PICT2, PICT0, PICT1) of a picture in the shuffled order. The embodiments are not limited in this context.

Figure 5:
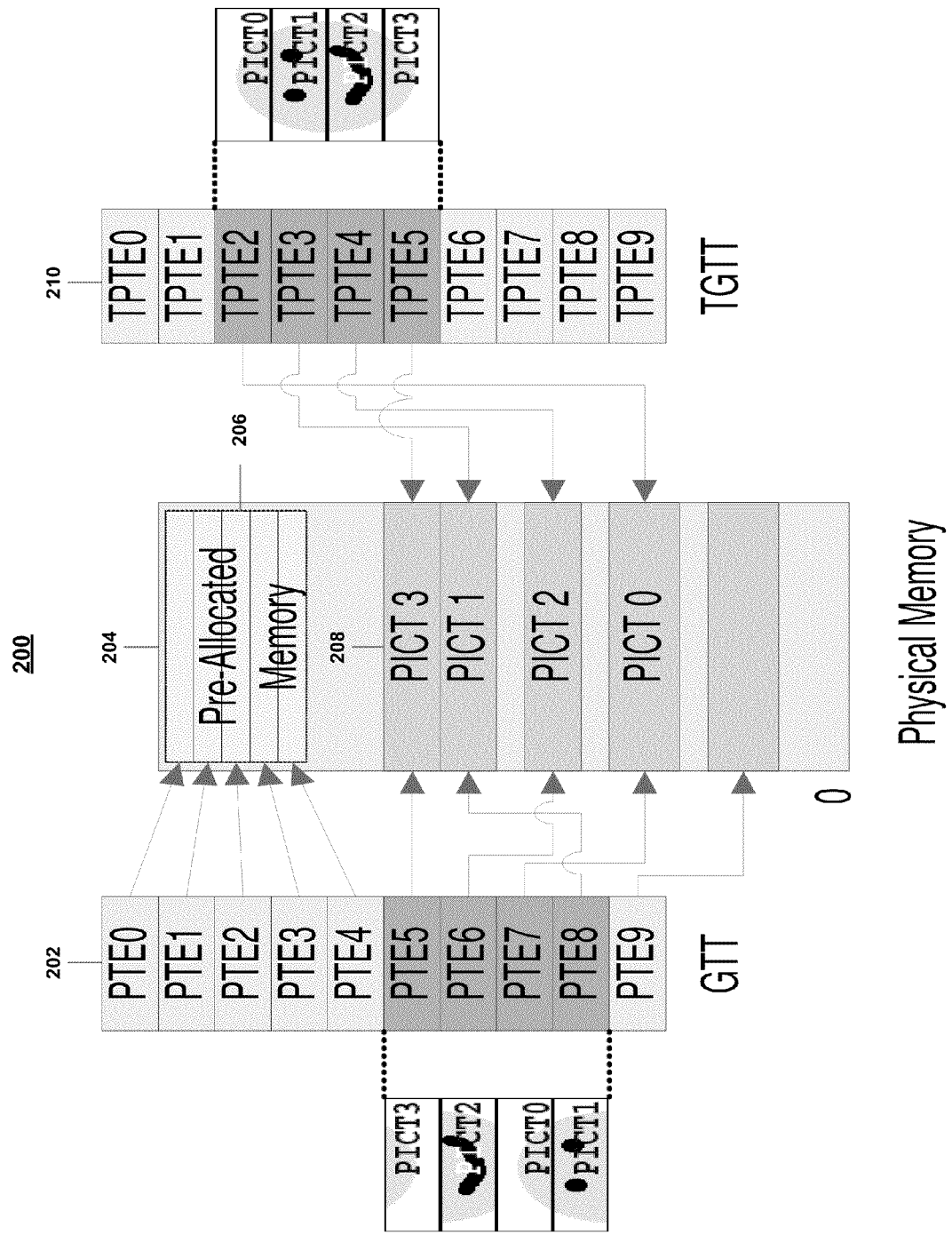
FIG. 5 illustrates one embodiment of a node.

FIG. 5 illustrates one embodiment of a node. FIG. 5 illustrates one embodiment of a media processing node 200. As shown, the media processing node 200 may comprise a GTT 202, physical memory 204, and TGTT 210. In various implementations, the TGTT 210 may be programmed to point to pre-allocated memory buffers 206 and system-allocated memory buffers 208 in the physical memory 204. The TGTT 202 may be programmed by a graphics driver module (e.g., graphics driver module 114), for example. In this example, the TGTT 210 may comprise ten TPTEs (TPTE0-TPTE9). It can be appreciated that the TGTT 210 may comprise a greater number or a fewer number of TPTEs for a given implementation. For example, in various implementations, the TGTT 210 may be much larger and comprise many more TPTEs. The embodiments are not limited in this context.

In various embodiments, the TGTT 210 may be programmed such that video information may be received in a correct order when accessed through the TGTT 210. The TGTT 210 may be programmed by a graphics driver module (e.g., graphics driver module 114) based on the shuffle order, for example. In various implementations, the TPTEs of the TGTT 210 may be programmed to unshuffle stored video information. Instructions for programming the TGTT 210 may be received in a secure command from a shuffling application (e.g., shuffling module 106), for example. As shown in this example, contiguous TGTT entries TPTE2 through TPTE5 may point to pages (PICT0, PICT1, PICT2, PICT3) of a picture in the correct order. The embodiments are not limited in this context.

To display the picture, the graphics driver 114 may create a command to display the overlay at the logical-trusted-address corresponding to the TPTE2. The command may be dispatched to a trusted ring buffer, for example. The execution of the overlay command may involve a lookup of the address in the TGTT 210 to determine the actual physical pages being used. The trusted graphics overlay hardware may correctly display the picture to a screen, for example. The embodiments are not limited in this context.

Operations for various embodiments may be further described with reference to the following figures and accompanying examples. Some of the figures may include a logic flow. It can be appreciated that the logic flow merely provides one example of how the described functionality may be implemented. Further, the given logic flow does not necessarily have to be executed in the order presented unless otherwise indicated. In addition, the logic flow may be implemented by a hardware element, a software element executed by a processor, or any combination thereof. The embodiments are not limited in this context.

Figure 6:
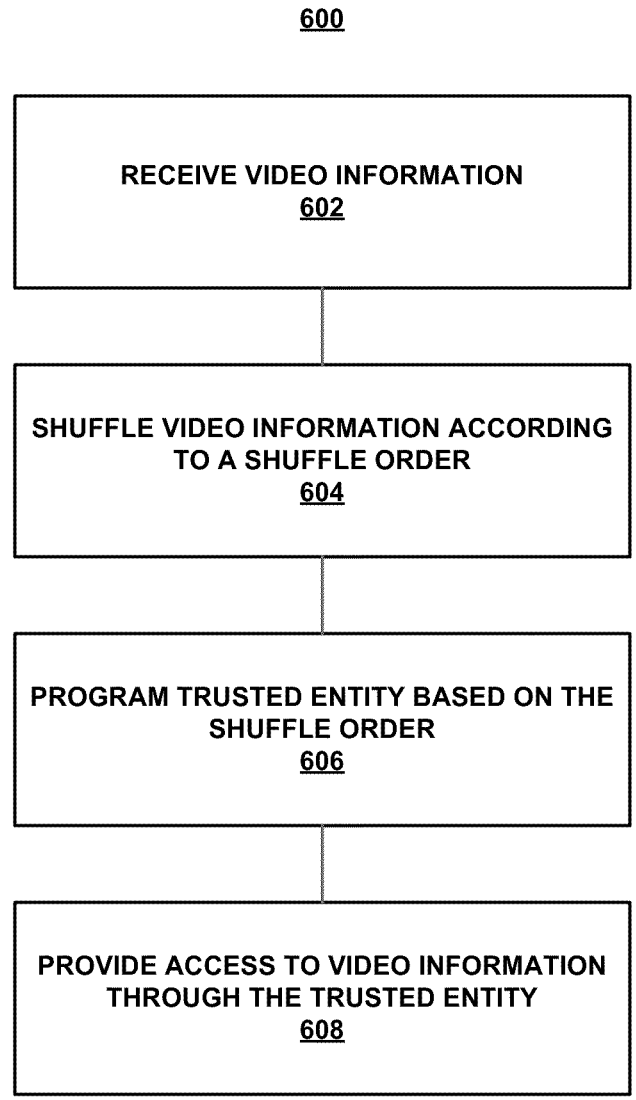
FIG. 6 illustrates one embodiment of a logic flow.

FIG. 6 illustrates one embodiment of a logic flow 600. FIG. 6 illustrates logic flow 600 for protecting video data. In various embodiments, the logic flow 600 may be performed by system (e.g., communications system 100) and/or a node (e.g., media processing node 102, media processing node 200). It is to be understood that the logic flow 600 may be implemented by various other types of hardware, software, and/or combination thereof. The embodiments are not limited in this context.

The logic flow 600 may comprise receiving video information (block 602). In various embodiments, the video information may comprise premium video content. The embodiments are not limited in this context.

The logic flow 600 may comprise shuffling the video information according to a shuffle order (block 604). In various embodiments, shuffling the video information may comprise shuffling the page order for a frame of video information. In various implementations, the memory page order for a frame of video information may be shuffled while keeping the page content (e.g., block order and/or pixel data) intact within the page. Adjacent pages, however, do not necessarily contain contiguous sets of blocks. The shuffle order may be changed for every frame of video information to provide additional security, for example. The embodiments are not limited in this context.

The logic flow 600 may comprise programming a trusted entity based on the shuffle order (block 606). In various embodiments, a trusted entity such as a TGTT may be programmed based on the shuffle order. The TGTT may be programmed such that when video information is accessed through the TGTT, the video information may be provided in an unshuffled manner (e.g., correct page order). In various implementations, the TGTT may comprise TPTEs programmed to unshuffle the video information.

The logic flow 600 may comprise providing access to video information through the trusted entity (block 608). In various embodiments, the video information may be provided in an unshuffled manner (e.g., correct page order) when accessed through the trusted entity, such as a TGTT. In various embodiments, the video information may be provided in a shuffled manner (e.g., shuffled page order) when not accessed through the trusted entity. When the video information is access through an untrusted GTT, for example, the video information may be provided in a shuffled manner. The embodiments are not limited in this context.

The described embodiments may provide sophisticated hardware-based security mechanisms that ensure only a trusted entity has access to a TGTT and prevent attack applications from viewing the memory through the TGTT. In various applications, security may be further heightened by changing the shuffle order with every video frame. The embodiments are not limited in this context.

The described embodiments may provide protection against a memory scraper class of attack. In various implementations, attack applications may only be able to view the memory pages in either a physically-contiguous, OS-contiguous, or GTT-contiguous order, and thus may never see video data in the correct order. Even if an attack application gains access to all of the pixels, such pixels are scattered throughout memory. Recovering a single page worth of video data, at best, may only reveal a luminance (black and white) version of a small subset of the video frame. Getting full color requires finding and somehow identifying the two chrominance pages that correspond to the luminance block, which are scattered somewhere else in memory. And, again, that is only for a small portion of the entire picture. The embodiments are not limited in this context.

The described embodiments may allow the playback on a PC of premium video content without requiring hardware encryption engines or hardening of the OS. In various implementations, systems may be able to play premium high definition content without the need for hardware-based cryptographic functions. In various embodiments, the shuffling techniques may be less expensive than hardware-based encryption approaches. In addition, the necessary TGTT mechanisms used for shuffling may be easier to implement in hardware than encryption engines capable of operating on uncompressed video data rates. The embodiments are not limited in this context.

In various implementations, the described embodiment may provide better performance than standard software-based encryption approaches, since the video data may be untouched in shuffling. The described embodiments may protect uncompressed pixels in unprotected memory on an open platform. Standard approaches for protecting compressed video, such as schemes used in DVD-Video, apply some form of encryption to the video data. Encryption algorithms typically involve XOR-ing the data with a pseudorandom cipher stream. Such encryption approaches obfuscate at a bit-level. The described embodiments, however, may be arranged to leave the pixels as clear text, while obfuscating the order. The embodiments are not limited in this context.

In various implementations, the described embodiments may be less burdensome computationally that standard software-based encryption approaches. In a software-based encryption approach, the CPU typically is burdened with XORing every byte of video data twice (once to encrypt, once to decrypt). Even if the decryption is handled in hardware, the CPU may not be sufficiently powerful to perform the necessary software encryption on HD video using industry-standard encryption techniques such as the advanced encryption standard (AES), for example. Also, pure software encryption solutions are likely to require other cryptographic hardware in order to meet the necessary security requirements for authenticating software encryption and decryption entities. The embodiments are not limited in this context.

In various implementations, the described embodiments may provide more flexibility than OS-specific security mechanisms. Creating an OS protected environment for premium content may require the use of a single OS and that every driver on the OS is signed. The described shuffling techniques, however, may be implemented across a wide variety of OSs without modification and without requiring every single driver on the OS to be signed. The embodiments are not limited in this context.

The described embodiments may be implemented for graphics platform, graphics chipsets, graphics vendors, video player application vendors, graphics and consumer video applications, and so forth. It can be appreciated, however, that the described embodiments may be implemented for non-video content. In addition, while some embodiments may use a GTT and/or a TGTT in various implementations, the described shuffling techniques may be applied generally to other scatter-gather mechanisms, for example. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In various implementations, the described embodiments may comprise, or form part of a wired communication system, a wireless communication system, or a combination of both. Although certain embodiments may be illustrated using a particular communications media by way of example, it may be appreciated that the principles and techniques discussed herein may be implemented using various communication media and accompanying technology.

In various implementations, the described embodiments may be arranged to communicate information wired or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the described embodiments may include components and interfaces suitable for communicating information signals over the designated wireless spectrum, such as one or more antennas, transmitters, receivers, transceivers, amplifiers, filters, control logic, and so forth. The embodiments are not limited in this context.

In various embodiments, communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth. The embodiments are not limited in this context.

In various implementations, the described embodiments may comprise or form part of a network, such as a Wide Area Network (WAN), a Local Area Network (LAN), a Metropolitan Area Network (MAN), the Internet, the World Wide Web, a telephone network, a radio network, a television network, a cable network, a satellite network, a wireless personal area network (WPAN), a wireless WAN (WWAN), a wireless LAN (WLAN), a wireless MAN (WMAN), a Code Division Multiple Access (CDMA) cellular radiotelephone communication network, a third generation (3G) network such as Wide-band CDMA (WCDMA), a fourth generation (4G) network, a Time Division Multiple Access (TDMA) network, an Extended-TDMA (E-TDMA) cellular radiotelephone network, a Global System for Mobile Communications (GSM)

cellular radiotelephone network, a North American Digital Cellular (NADC) cellular radiotelephone network, a universal mobile telephone system (UMTS) network, and/or any other wired or wireless communications network configured to carry data. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk ROM (CD-ROM), Compact Disk Recordable (CD-R), Compact Disk Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a processor operative to receive a first frame of video information comprising a first plurality of memory pages and a second frame of video information comprising a second plurality of memory pages, said processor comprising:
a shuffling module operative to:
shuffle the first plurality of memory pages according to a shuffle order;
encrypt the shuffle order and transmit the encrypted shuffle order via a secure command;
change the shuffle order; and
shuffle the second plurality of memory pages according to the changed shuffle order; and
a trusted entity programmed based on the shuffle order to provide access to the first frame of video information, wherein the first frame of video information is provided in an unshuffled manner when accessed through the trusted entity.

2. The apparatus of claim 1, wherein said trusted entity comprises a trusted graphics translation table.

3. The apparatus of claim 1, wherein said processor comprises an untrusted graphics translation table.

4. The apparatus of claim 3, wherein the first frame of video information is provided in a shuffled manner when accessed through said untrusted graphics translation table.

5. The apparatus of claim 1, the shuffling module operative to shuffle the first plurality of memory pages while keeping a block order of each of the first plurality of memory pages intact.

6. The apparatus of claim 1, the trusted entity comprising a scatter-gather table.

7. The apparatus of claim 1, the processor operative to dispatch a command to a trusted ring buffer to display an overlay at a logical trusted address corresponding to one or more trusted page table entries of the trusted entity.

8. A method, comprising:
receiving a first frame of video information comprising a first plurality of memory pages and a second frame of video information comprising a second plurality of memory pages;
shuffling, by a processor, the first plurality of memory pages according to a shuffle order;
programming a trusted entity based on the shuffle order;
encrypting the shuffle order and transmitting the encrypted shuffle order via a secure command;
changing the shuffle order;
shuffling the second plurality of memory pages according to the changed shuffle order; and
providing access to the first frame of video information through said trusted entity, wherein the first frame of video information is provided in an unshuffled manner when accessed through the trusted entity.

9. The method of claim 8, further comprising programming a trusted graphics translation table.

10. The method of claim 8, further comprising programming an untrusted graphics translation table.

11. The method of claim 10, further comprising providing the first frame of video information in a shuffled manner through said untrusted graphics translation table.

12. The method of claim 8, comprising shuffling the first plurality of memory pages while keeping a block order of each of the first plurality of memory pages intact.

13. The method of claim 8, the trusted entity comprising a scatter-gather table.

14. The method of claim 8, comprising dispatching a command to a trusted ring buffer to display an overlay at a logical trusted address corresponding to one or more trusted page table entries of the trusted entity.

15. An article comprising a non-transitory machine-readable storage medium containing instructions that if executed enable a system to:
  receive a first frame of video information comprising a first plurality of memory pages and a second frame of video information comprising a second plurality of memory pages;
  shuffle the first plurality of memory pages according to a shuffle order;
  program a trusted entity based on the shuffle order;
  encrypt the shuffle order and transmit the encrypted shuffle order via a secure command;
  change the shuffle order;
  shuffle the second plurality of memory pages according to the changed shuffle order; and
  provide access to the first frame of video information through said trusted entity, wherein the first frame of video information is provided in an unshuffled manner when accessed through the trusted entity.

16. The article of claim 15, further comprising instructions that if executed enable the system to program a trusted graphics translation table.

17. The article of claim 15, further comprising instructions that if executed enable the system to program an untrusted graphics translation table and provide the first frame of video information in a shuffled manner through the untrusted graphics translation table.

18. The article of claim 15, comprising instructions that if executed enable the system to shuffle the first plurality of memory pages while keeping a block order of each of the first plurality of memory pages intact.

19. The article of claim 15, the trusted entity comprising a scatter-gather table.

20. The article of claim 15, comprising instructions that if executed enable the system to dispatch a command to a trusted ring buffer to display an overlay at a logical trusted address corresponding to one or more trusted page table entries of the trusted entity.

* * * * *